Dec. 6, 1955     H. D. FAHRENHOLZ     2,725,700
ROCK PICKER
Filed March 5, 1952                                                                        3 Sheets-Sheet 1
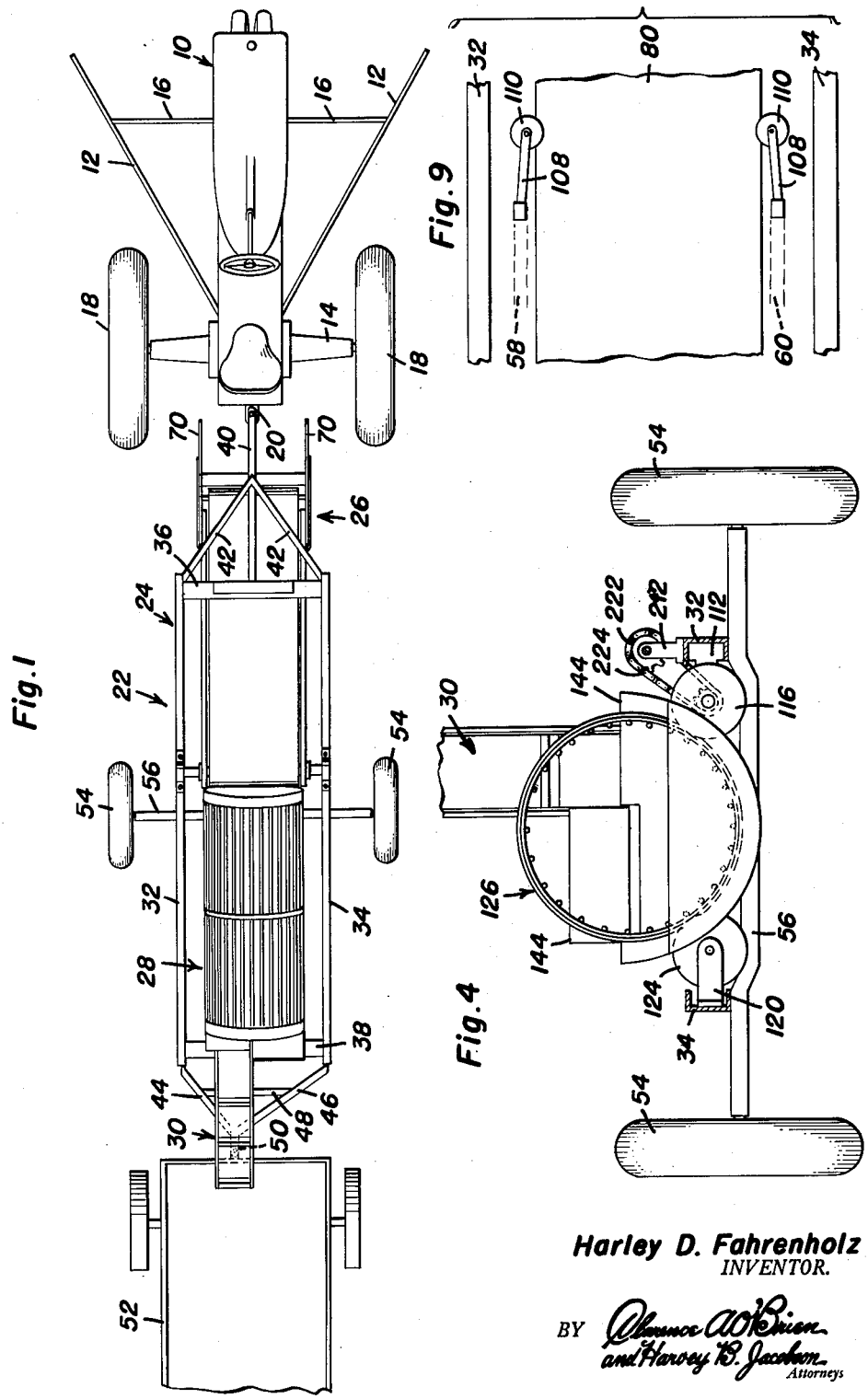
Harley D. Fahrenholz
*INVENTOR.*
BY *Clarence A. O'Brien
and Harvey B. Jacobson*
                               *Attorneys*

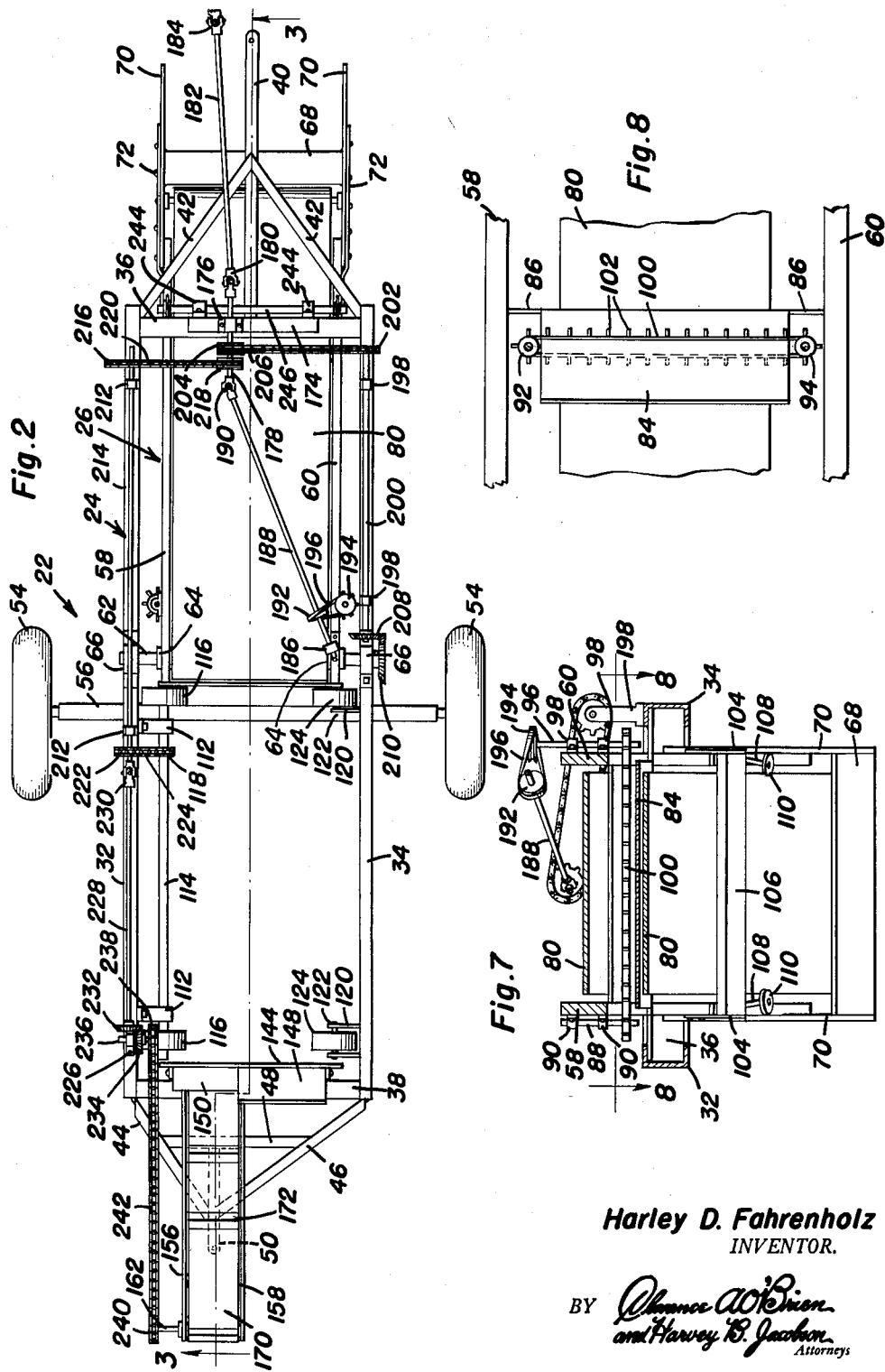
Dec. 6, 1955  H. D. FAHRENHOLZ  2,725,700
ROCK PICKER
Filed March 5, 1952  3 Sheets-Sheet 2
Harley D. Fahrenholz
INVENTOR.

Dec. 6, 1955 H. D. FAHRENHOLZ 2,725,700
ROCK PICKER
Filed March 5, 1952 3 Sheets-Sheet 3
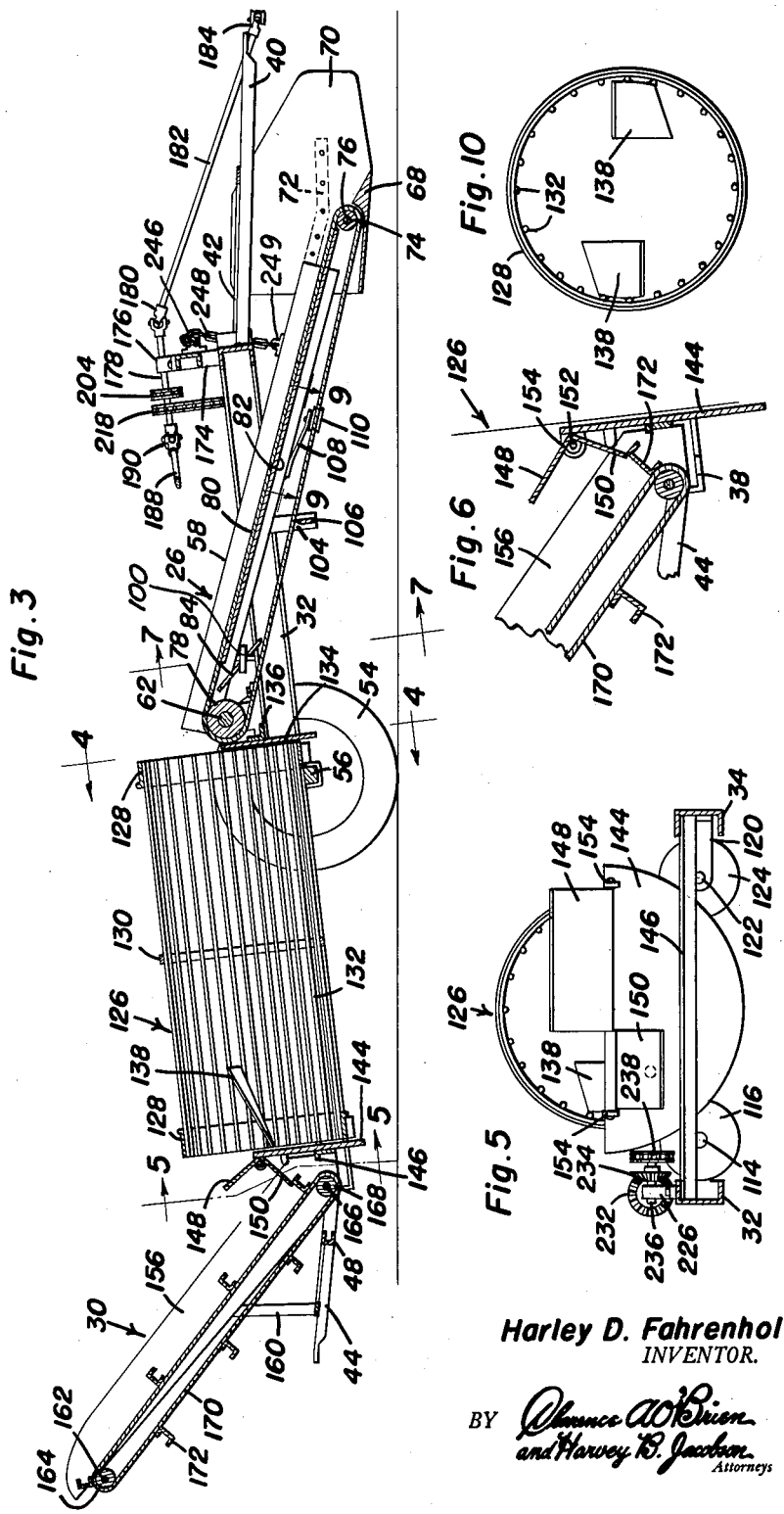
Harley D. Fahrenholz
INVENTOR.

United States Patent Office 2,725,700
Patented Dec. 6, 1955

2,725,700

ROCK PICKER

Harley D. Fahrenholz, Eagle Bend, Minn.

Application March 5, 1952, Serial No. 274,873

5 Claims. (Cl. 55—17)

This invention relates in general to a rock picker, and more particularly to a rock picker intended to be drawn behind a tractor in order to remove rocks from a field.

The primary object of this invention is to provide an improved rock picker which may be drawn across a field desirable for farming whereby rock and dirt will be moved into the rock picker and the dirt separated from the rocks, the rock being transferred to a wagon and disposed of.

Another object of this invention is to provide an improved rock picker having a conveyor mounted on the forward end thereof for elevating rock and dirt into a rock tumbler whereby the dirt is disposed back onto the field.

Another object of this invention is to provide an improved rock picker having a conveyor for elevating rock and dirt, said conveyor being pivotally mounted on the frame of the rock picker whereby the forward ends thereof may be adjusted to the desired height, and whereby the forward end may move outwardly upon striking a large rock.

Another object of this invention is to provide an improved conveyor structure for a rock picker, said conveyor structure having plates underlying a conveyor belt mounted thereon, said plates being adapted to receive dirt falling off of said conveyor belt; one of said plates being associated with a scraper for moving the dirt transversely of the conveyor and depositing the same onto a field being worked by the rock picker.

Another object of this invention is to provide an improved rock picker having a conveyor for loading rock and dirt into a tumbler, and an elevator associated with said tumbler for moving rock from said tumbler into a wagon, said conveyor, tumbler and elevator being operated by a common drive means driven by a power take off of a tractor towing said rock picker.

Another object of this invention is to provide an improved tumbler for use in a rock picker, said tumbler being rotatably mounted on a plurality of rollers and having an open frame work whereby dirt placed therein along with rock will be emptied directly upon the field over which the rock picker is being drawn, said tumbler having gate means at the rear end thereof whereby rocks will be emptied therefrom only at such a rate which can be handled by an elevator mounted on the rock picker rearwardly of the tumbler.

A further object of this invention is to provide an improved rock picker which is drawn by a conventional tractor, said tractor having scraper blades thereon to windrow a wide area of a field into a narrow windrow which may be picked up by said rock picker and rock separated from the dirt in the windrow.

A still further object of the invention is to provide an improved rock picker which may be drawn behind a conventional farm tractor, said rock picker having a trailer hitch means on the rear portion of its frame whereby a wagon may be drawn directly behind said rock picker in underlying relation to an elevator mounted thereon for delivering rock from a tumbler into said wagon.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a general top plan view of the rock picker, which is the subject of this invention, and showing the same being drawn behind a conventional farm tractor having a pair of scraper blades mounted thereon, a wagon being drawn behind said rock picker, the rock picker being only generally illustrated and not showing the specific drive means and the other specific details thereof;

Figure 2 is an enlarged top plane view of the rock picker of Figure 1 and showing the specific details of the drive means thereof, the rock tumbler, which is a portion of the rock picker, being omitted in order to illustrate the mounting means and the drive means therefor;

Figure 3 is a longitudinal transverse sectional view taken substantially upon the plane indicated by the section line 3—3 of Figure 2 and showing the general construction of the rock picker, the rock tumbler being illustrated, the forward end of the conveyor being illustrated in a raised position, and alternate positions of a gate means for controlling the flow of the rock out of the tumbler being illustrated in dotted lines;

Figure 4 is an enlarged partial transverse vertical sectional view taken substantially upon the plane indicated by the section line 4—4 of Figure 3 and showing the manner in which the rock tumbler is rotatably mounted on the frame of the rock picker;

Figure 5 is an enlarged partial transverse vertical sectional view taken substantially upon the plane indicated by the section line 5—5 of Figure 3 and showing the construction of the rock tumbler and a gate means therefor;

Figure 6 is an enlarged fragmentary longitudinal vertical sectional view similar to Figure 3 and showing the construction of the gate means at the rear of the rock tumbler for controlling the flow of rock from the tumbler;

Figure 7 is an enlarged partial transverse vertical sectional view through the conveyor and taken substantially upon the plane indicated by the section line 7—7 of Figure 3 and showing the arrangements of the various elements of the conveyor including a scraper for removing dirt deposited on a plate by said conveyor and its associated conveyor belt;

Figure 8 is an enlarged horizontal partial sectional view taken substantially upon the plane indicated by the section line 8—8 of Figure 7 and showing the construction of the scraper for removing dirt from one of said plates carried by said conveyor;

Figure 9 is an enlarged partial substantially horizontal sectional view taken substantially upon the plane indicated by the section line 9—9 of Figure 3 and showing the manner in which the bottom portions of a conveyor belt carried by said conveyor is supported intermediate its supporting rollers; and Figure 10 is an enlarged end elevational view of the rock tumbler per se and showing the construction of the end plate closing the rear end thereof, and the arrangement of openings therein for emptying rocks therefrom.

Similar characters of reference designate similar or identical elements and portions throughout the specification and throughout the different views of the drawings.

Referring now to the drawings in detail, it will be seen that there is illustrated in Figure 1 a conventional tractor 10 which is provided with a pair of scraper blades 12, the scraper blades 12 diverging rearwardly and secured to the tractor 10 adjacent its rear wheel housing 14. The scraper blades 12 are braced from the forward portion of the tractor 10 by braces 16. The tractor 10 is of the conventional type and has rear wheels 18 and a trailer hitch 20.

Towed behind the tractor 10 is the rock picker, which is the subject of this invention, referred to in general by the reference numeral 22. The rock picker 22 includes a frame portion 24, a conveyor portion 26, a rock tumbler 28, and an elevator 30. The frame 24 includes longitudinally extending side rails 32 and 34 which are secured together at their forward ends by a transverse front cross member 36 and at their rear ends by a transverse rear cross member 38. Carried by the transverse front cross member 36 and extending forwardly therefrom is a draw bar 40 which is secured to the trailer hitch 20 of the tractor 10. The draw bar 40 is braced by a pair of diagonal brace members 42 converging forwardly from the forward ends of the side rails 32 and 34.

Extending rearwardly of the frame 24 and connected to the rear end of the side rails 32 and 34 are diagonal members 44 and 46. It will be noted that the diagonal member 46 is much longer than the diagonal member 44 so that they are joined together offset of the center line of the frame 24. The diagonal members 44 and 46 are additionally braced by a transverse member 48. Extending rearwardly of the connection between the diagonal members 44 and 46 is a trailer hitch 50. Secured to the trailer hitch 50 is a conventional farm wagon 52 of which only the forward portion is illustrated.

The rock picker 22 is supported on a pair of wheels 54 which are rotatably mounted on an axle 56 which is supported by the frame 24.

Referring now to Figures 2, 3 and 7 in particular, it will be seen that the conveyor 26 includes a pair of longitudinally extending side rails 58 and 60, the side rails also acting as side boards for the conveyor. The side rails 58 and 60 are connected together at their rear ends by a conveyor drive shaft 62 which is rotatably mounted in journals 64 carried by the side rails 58 and 60. The shaft 62 is also journaled in journals 66 carried by the side rails 32 and 34 of the frame 24 and thereby supports the rear end of the conveyor 26 with respect to the frame 24. The forward ends of the side rails 58 and 60 are connected together by a scraper blade 68 which extends between and is secured to a pair of guide plates 70 which are in turn secured to the forward ends of the side rails 58 and 60. The guide plates 70 extend forwardly of the side rails 58 and 60, and the scraper blade 68, and are in turn reenforced with respect to the side rails 58 and 60 by angular flat bars 72.

Extending between the guide plates 70 and rotatably journaled thereon is an idler shaft 74. Mounted on the idler shaft 74 for rotation therewith is an idler roller 76. Mounted at the other end of the conveyor 26 for rotation with the drive shaft 62 is a drive roller 78. Extending between the roller 78 and the roller 76 and entrained thereover is a continuous conveyor belt 80 adapted to be rotated by the roller 78 on the drive shaft 62. Extending between the side rails 58 and 60 of the conveyor 26 and immediately underlying the upper portion of the conveyor belt 80 is a plate 82. It will be noted that the plate 82 terminates short of the rear end of the conveyor belt 80 and has a diagonal plate 84 underlying the upper end thereof. The diagonal plate 84 extends transversely of the conveyor 26 and is secured to the side rails 58 and 60. The purpose of the plates 82 and 84 is to receive any dirt which may fall off the edges of the conveyor belt 80.

Referring now to Figure 8 in particular, it will be seen that the plate 84 extending transversely between the side rails 58 and 60 has only a lower portion 86 thereof secured to the side rails. As is best illustrated in Figure 7, the side rail 58 is provided with a shaft 88 which is secured thereto by brackets 90. Carried by the shaft 88 and disposed below the lower edge of the side rail 58 is an idler pulley 92 which is in horizontal alignment with a drive pulley 94 mounted on the opposite side of the conveyor 26. The drive pulley 94 is rotatably mounted with respect to the side rail 60 on a shaft 96 which is journaled in mounting brackets 98 carried by the side rail 60. Extending between and entrained over the pulleys 92 and 94 is a belt 100 which passes around the diagonal plate 84 and engages the upper side thereof. The scraper belt 100 is provided with a plurality of scraper blades 102 for moving dirt deposited upon the plate 84 transversely thereof and to one side of the conveyor belt 80 where it is deposited back upon the ground. The manner in which the shaft 96 connected to the drive pulley 94 is rotated will be explained in more detail hereinafter.

Referring now to Figures 3 and 7 in particular, it will be seen that extending downwardly from each of the side rails 58 and 60 of the conveyor 26 is a bracket 104. Extending between the lower ends of the individual brackets 104 and secured thereto is a scraper blade 106. As is best illustrated in Figure 3, the upper edge of the scraper blade 106 engages the lower surface of the lower portion of the conveyor belt 80 to remove any accumulation of dirt or other foreign matter thereon.

In order that the lower portion of the conveyor belt 80 may be supported intermediate its ends, each of the side rails 58 and 60 is provided with a forwardly extending arm 108 on which is mounted a pulley 110. Each pulley 110 engages one side edge of the conveyor belt 80 in order to support the same intermediate its ends.

Referring now to Figure 2 in particular, it will be seen that there is mounted on the frame side rails 32 and 34 rearwardly of the conveyor structure 26 a rock tumbler structure 28. The rock tumbler structure 28 includes a pair of journals 112 mounted on the side rail 32 with a longitudinally extending shaft 114 rotatably journaled therein. Carried by the shaft 114 is a pair of rollers or wheels 116 and a drive sprocket 118. The drive pulley sprocket 118 is connected to drive means which will be explained in more detail hereinafter.

Carried by the side rail 34 of the frame 24 is a pair of U-shaped mounting brackets 120. The U-shaped mounting brackets 120 are provided with longitudinally extending shafts 122 on which are rotatably mounted rollers or wheels 124, the rollers 124 being in transverse alignment with the rollers 116. It will be understood that the rollers 116 with be drive rollers and the rollers 124 will be idler rollers. Referring now to Figure 3 in detail, it will be seen that mounted on the rollers 116 and 124 is a rock tumbler cage 126. The rock cage 126 includes a pair of wide annular end rings 128 and an intermediate annular ring 130. Extending between the end annular rings 128 and secured thereto and to the intermediate end of the ring 130 is a plurality of spaced parallel bars 132. It will be understood that the rock cage 126 rests upon the rollers 116 and 124 and is rotated by contact with the drive rollers 116.

The forward end of the rock cage 126 of the rock tumbler structure 28 is disposed adjacent the rear end of the conveyor 26 and is open. However, the lower portion of the forward end of the rock cage 126 is closed by a fixed plate 134 which extends between and is secured to the side rails 32 and 34 of the frame 24 by an angle bar 126.

Carried within the rock cage 126 and mounted adjacent the rear end thereof is a pair of helically curved plates 138.

Referring now to Figures 3 and 5 in particular, it will be seen that the frame 24 is provided with a substantially semicircular plate 144 which is disposed at the rear end of the rock cage 126 and supported from the side rails 32 and 34 of the frame by a transversely extending angular member 146. Extending upwardly from the upper right hand portion of the plate 144, as viewed from the rear is a rearwardly and upwardly extending plate 148. Pivotally mounted at the upper edge of the plate 144 at the left side thereof, as viewed from the rear, and extending rearwardly and downwardly therefrom is a gate 150. The gate 150 is rotatably mounted on a shaft 152 carried by brackets 154 mounted on the plate 144.

As is best illustrated in Figures 2, 3 and 6, there is mounted an elevator structure 30. The elevator structure 30 has a pair of side rails 156 and 158 which also act as side boards for the edges of the elevator. The forward ends of the side rails 156 and 158 are secured to the transverse member 146 supporting the plate 144. The side rails 156 and 158 are also supported intermediate their ends by standards 160 extending upwardly from the diagonal members 44 and 46 of the frame 24. Mounted at the rear upper ends of the side rails 156 and 158 for rotation with respect thereto is a drive shaft 162. Mounted on the drive shaft 162 for rotation therewith a drive roller 164. Extending between and rotatably journaled with respect to the side rails 156 and 158 at their lower forward ends is an idler shaft 166 having mounted thereon an idler roller 168. Extending between and entrained over the rollers 164 and 168 is a conveyor belt 170. The conveyor belt 170 is provided with a plurality of channel shaped bars 172 which extend transversely thereof. It is intended that the transverse bars 172 engage rocks deposited upon the conveyor belt 170 and elevate same in order to deposit them into the wagon 52 which is drawn to the rear of and below the rear upper end of the conveyor belt.

Referring now to Figures 2 and 3 in particular, it will be seen that carried by the front cross frame member 36 of the frame 24 is a generally U-shaped mounting bracket 174 which is channel shaped in cross-section. Carried by the upper surface of the U-shaped mounting bracket 174 is a pillow block 176 in which is rotatably mounted a drive shaft 178. Extending forwardly of the drive shaft 178 and connected thereto by a universal joint 180 is an extension 182. It is intended that the extension 182 be connected to a power take-off of the tractor 10 by a universal joint 184.

Carried by the side rail 60 of the conveyor structure 26 and extending upwardly therefrom is a mounting bracket 186. A drive shaft 188 has its rear end rotatably journaled within the mounting bracket 186 and is connected to the rear end of the drive shaft 178 by a universal joint 190. The drive shaft 188 is provided with a pulley 192 adjacent its mounting bracket 186. The pulley 192 being generally in alignment with the upper end of the shaft 96 and a pulley 194 mounted thereon. Extending between and entrained over the pulleys 192 and 194 is a belt 196 for driving the shaft 96 and its associated scraper belt 100.

Mounted on the side rail 34 of the frame 24 adjacent the conveyor structure 26 is a pair of mounting brackets 198 in which is rotatably mounted a shaft 200 which extends longitudinally of the frame 24 and in vertical alignment with the side rail 34. At the forward end of the shaft 200 is a sprocket 202 which is in transverse alignment with the sprocket 204 carried by the drive shaft 178. Extending between and entrained over the sprockets 202 and 204 is a drive chain 206 for driving the shaft 200. Mounted on the rear shaft 200 for rotation therewith is a beveled gear 208 which is in engagement with a bevel gear 210 mounted on the drive shaft 62 for driving the conveyor belt 80.

Secured to the upepr surface of the side rails 32 of the frame 24 is a pair of longitudinally spaced mounting brackets 212 in which are rotatably journaled a longitudinally extending drive shaft 214. Mounted at the forward end of the drive shaft 214 is a sprocket 216 in transverse alignment with the sprocket 218 mounted on the drive shaft 178. Extending between and entrained over the sprockets 216 and 218 is a drive chain 220 for driving the drive shaft 214. Mounted adjacent the rear end of the drive shaft 214 and in transverse alignment with the drive sprocket 118 on the drive shaft 114 of the rock tumbler structure 28 is a sprocket 222. Extending between and entrained over the sprockets 118 and 222 is a drive chain 224 for driving the shaft 114.

Secured to the upper surface of the side rail 32 and adjacent its rear end is a mounting bracket 226, which supports the rear end of a drive shaft 228 which extends longitudinally of the frame 24 and is secured to the rear end of the drive shaft 214 by universal joint 230. The rear end of the drive shaft 228 is provided with a bevel gear 232 which is in engagement with the second bevel gear 234 mounted on a shaft 236. It will be noted that the shaft 236 is also supported by the mounting bracket 226 and is provided at its inner end with a sprocket 238. In longitudinal alignment with the sprocket 238 and secured to an extension of the drive shaft 162 of the elevator 30 is a sprocket 240. Extending between and entrained over the sprockets 238 and 240 is a drive chain 242. It will be understood that when the drive shaft 182 is rotated that the shaft 162 will also be rotated for driving the elevator structure 30.

When the tractor 10 is moved forward while towing the rock picker 22, the scraper blades 12 carried by the tractor engages the earth of a field and moves same into a windrow (not shown) as the tractor 10 continues to move forward, the dirt and rocks piled into the windrow is guided into the rock picker 22 by the guide plates 70 mounted at the forward end of the conveyor portion 26 of the rock picker. The dirt and rocks in the windrow then strike the scraper blade 68 mounted at the forward end of the conveyor structure 26 and are guided onto the conveyor belt 80. The dirt and rock are then moved up the conveyor belt 80 and deposited within the rock cage 126 of the rock tumbler structure 28. However, a small amount of the dirt will have a tendency to fall off of the conveyor belt 80 and will be deposited upon the transversely extending diagonal plate 84 where it moves transversely of the conveyor structure 26 by the scraper belt 100 and deposited back upon the ground.

After the rock and dirt have been deposited within the rock cage 126, they are rotated whereby the dirt falls through the spaces between the bars 132 and the rocks are retained in the rock cage. Since the rock cage 126 slopes downwardly and rearwardly, the rocks are moved to the rear of the rock picker 22 due to the rotation of the rock cage 126. The rocks are then engaged by the helically curved plates 138. The rocks are then deposited upon the conveyor belt 170 and moved outwardly and rearwardly by the transverse bars 172 mounted thereon and deposited into the wagon 52 carried at the rear of the rock picker 22. However, if the conveyor belt 170 becomes overloaded, the pivoted gate 150 will move upwardly and some of the rocks will be deposited behind the upwardly and rearwardly sloping plate 148 whereby they will be deposited back into the rock cage 126. It will be noted that the pivoted gate 150 engages the transverse bars 172 as they rotate by in order to assure that the rocks passing through the rock cage are deposited upon the conveyor belt 170.

Referring now to Figures 2 and 3 in particular, it will be seen that the U-shaped mounting bracket 174 is provided with a pair of pillow blocks 244 in which is rotatably journaled a transverse shaft 246. Secured to the transverse shaft 246 adjacent its ends and in vertical alignment with the side rails 58 and 60 of the conveyor structure 26 is a pair of flexible members in the form of chains or cables. The flexible members are referred to by the reference numerals 248 and are suitably connected at their lower ends 249 to the side rails 58 and 60. By rotating the transverse shaft 246, the forward end of the conveyor structure 26 may be raised or lowered to the desired height with respect to the frame 24 of the rock picker 22. Also, since the forward end of the conveyor structure 26 is supported by flexible members, the forward end thereof may be free to move upwardly if the scraper blade 68 strikes a large rock in the ground.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A rock picker combination comprising a frame, a forward endless conveyor mounted on the frame, a scraper blade carried at the forward end of said conveyor, a rotary tumbler carried by said frame, and drive means operatively connected to said conveyor and tumbler; said conveyor including side rails in the form of side boards, an endless conveyor belt rotatable between said side rails, guide plates carried at the forward end of said conveyor on opposite sides of said scraper blade, said guide plates being adapted to guide dirt and rock onto said conveyor belt, an elongated plate extending between said side rails and underlying the upper portion of said conveyor belt, said plate terminating short of the rear end of the conveyor belt, a transversely extending plate disposed transversely of said conveyor and underlying the rear end of said elongated plate, and a movable scraper operatively associated with said transverse plate for moving dirt off of said transverse plate.

2. A rock picker combination as set forth in claim 1 wherein said movable conveyor comprises an endless conveyor transversely disposed on opposite sides of said transversely extending plate.

3. A rock picker combination as set forth in claim 1 wherein a second endless conveyor is supported on said frame having an end portion adjacent a discharge end portion of said rotary tumbler, and means supported on said frame for controlling the movement of rock from said rotary tumbler onto said second endless conveyor.

4. A rock picker combination as set forth in claim 3 wherein said tumbler includes a plurality of helically curved plates secured on the inner periphery of said tumbler adjacent the rear end of said tumbler for moving rock out of said tumbler onto said second conveyor.

5. A rock picker combination as set forth in claim 4 wherein said last mentioned means includes a fixed plate mounted on said frame adjacent the rear end of said rotary tumbler, said fixed plate having means for returning excess rock into said tumbler, a gate pivotally mounted on said fixed plate adjacent said means for controlling and directing the flow of rock from said tumbler onto said second endless conveyor.

References Cited in the file of this patent

UNITED STATES PATENTS

| 685,908 | Colgrove | Nov. 5, 1901 |
| 1,124,972 | Talley | Jan. 12, 1915 |
| 2,296,851 | Henry | Sept. 29, 1942 |
| 2,569,719 | Huhne | Oct. 2, 1951 |

FOREIGN PATENTS

| 618,019 | Great Britain | Feb. 15, 1949 |